April 3, 1956   J. S. SWEARINGEN   2,740,298
DYNAMIC BALANCING APPARATUS
Filed Aug. 16, 1951   2 Sheets-Sheet 1
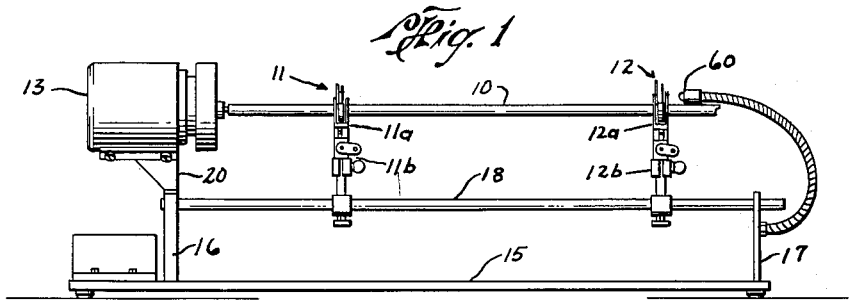
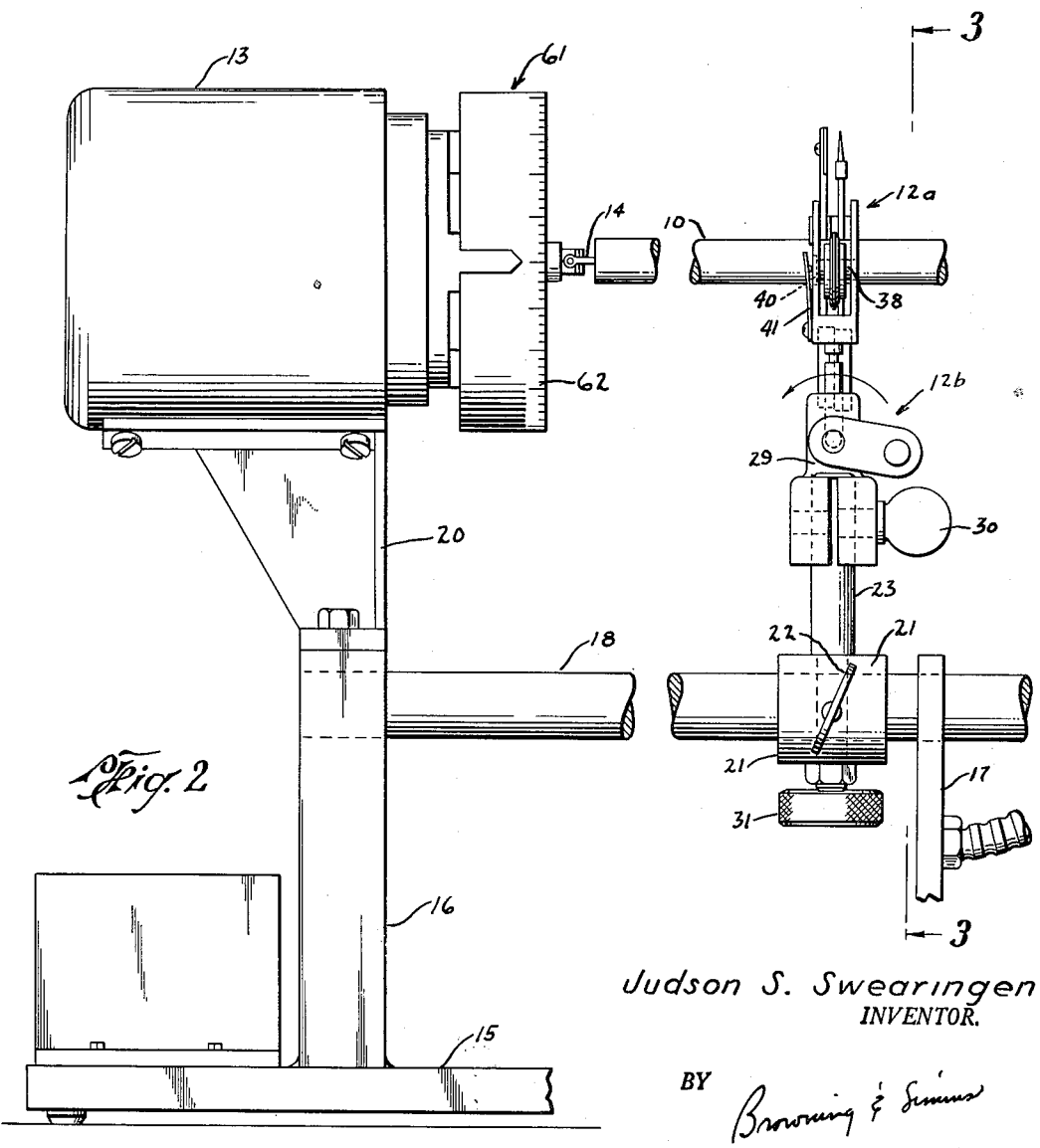
Judson S. Swearingen
INVENTOR.
BY Browning & Simms
ATTORNEYS April 3, 1956     J. S. SWEARINGEN     2,740,298
DYNAMIC BALANCING APPARATUS
Filed Aug. 16, 1951     2 Sheets-Sheet 2
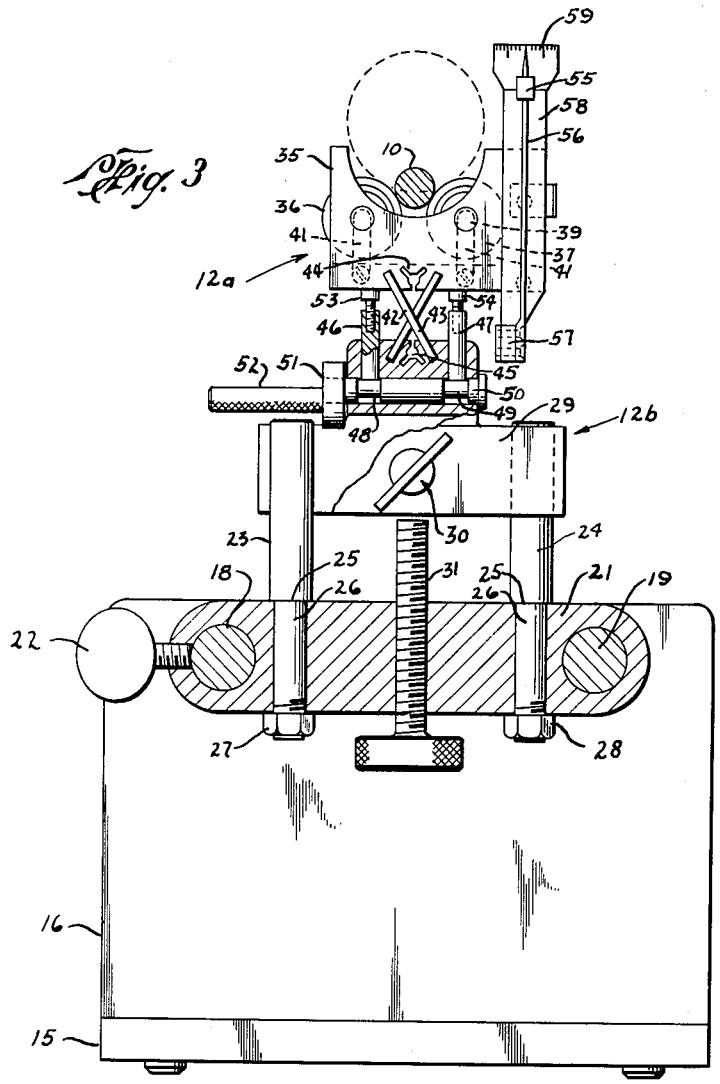
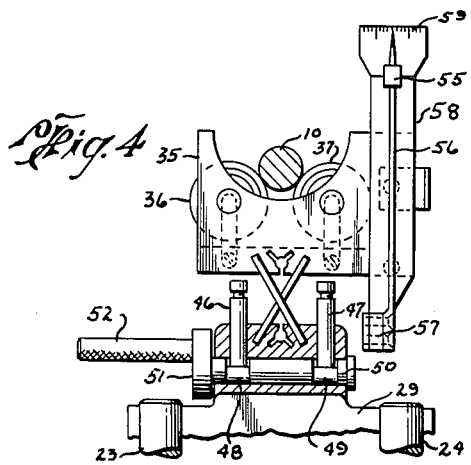
Judson S. Swearingen
INVENTOR.
BY Browning & Simms
ATTORNEYS

United States Patent Office 2,740,298
Patented Apr. 3, 1956

2,740,298

DYNAMIC BALANCING APPARATUS

Judson S. Swearingen, San Antonio, Tex.

Application August 16, 1951, Serial No. 242,074

2 Claims. (Cl. 73—478)

This invention relates to an apparatus for determining the dynamic unbalance of a rotating mass and the angular location thereof with respect to a predetermined plane. In one of its aspects, it relates to an apparatus for determining the dynamic unbalance and angular location thereof in a wheel such as an automobile wheel.

It has now been found that in a dynamic balancing system wherein a dynamically unbalanced mass is rotated at a constant speed to impress a frequency on a driven vibratory mass elastically connected to the rotating mass so that the action of the driven mass is indicative of the amount and location of unbalance in the rotating mass, a greatly improved apparatus can be provided by tuning the driven vibratory mass to have a natural frequency differing from that of the rotating mass by a small but predetermined and constant amount. Thus, the natural frequency of the vibratory mass is tuned to be out of resonance with the frequency impressed thereon by the rotating mass. The advantages to be derived from such a mode of procedure will be more apparent from the following discussion.

In a system wherein there is a steady forced vibration with viscous damping, there will result a simple harmonic motion having a constant amplitude. The amplitude of the forced vibration is the product of the static effect of the disturbing force and a term denoted as the "magnification factor." The latter is dependent for its value upon the amount of damping and also on the ratio of the frequency of the disturbing force to the frequency of free vibration of the system, i. e. the ratio of the impressed frequency to the natural frequency. In any given system, the value of the static effect will be constant and, hence, any variation in the amplitude of the forced vibration is dependent upon the value of the magnification factor. When the impressed frequency is small compared with the natural frequency, the value of the magnification factor is not greatly different from unity. This means that during vibration, the displacements of the mass having a forced vibration are approximately those which would be produced by the purely statical effect of the disturbing force.

When the impressed frequency is much greater than the natural frequency, the value of the magnification factor tends towards zero regardless of the amount of damping or vibration-resisting friction existent in the system. This means that a high frequency disturbing force produces practically no forced vibrations in a system that has a low natural frequency.

In both of these extreme cases, damping has only a secondary effect on the magnitude of the magnification factor. Thus, when approaching the extremes of these cases, the effect of damping can be neglected in a practical sense.

However, when the impressed or driving frequency equals the natural frequency of the driven vibratory mass, i. e. they are in a state of resonance, the magnification factor rapidly increases in value as the amount of damping decreases so that in a practical resonant-tuned dynamic balancing system wherein it is sought to reduce damping to a minimum, the magnification factor and hence the amplitude of the forced vibrations will approach an infinitely large value as their limit. Under such conditions, minor variations in the amount of damping will cause a tremendous variation in the magnification factor and therefore in the amplitude of the forced vibrations so that as a practical matter, damping cannot be reduced without the inherent variation thereof causing erroneous effects in the amplitude of the forced vibrations, the latter being employed in dynamic balancing apparatus as indicia of the amount of unbalance of the rotating mass.

Further, in such resonance-tuned dynamic balancing systems, the variation in amplitude itself will cause a variation in the amount of damping and the latter variations are particularly noticeable where the absolute amount of damping is small. As a result, the amplitude of the forced vibrations in such systems is not a reliable measure of the unbalance of a rotating mass.

It has now been found that by tuning the natural frequency of the driven vibratory mass to be slightly out of resonance with the speed of rotation of the mass whose unbalance is being determined, the variations in damping, as occasioned by the inherent characteristics of the mechanical balancing apparatus as well as those generated by the variations in amplitude of vibrations themselves, will have a minimum effect upon the amplitude of vibration of the driven vibratory mass even though the magnitude of damping be very small. Thus, the need to control the amount of damping to be constant in order to make satisfactory determinations of unbalance of a mass is very substantially reduced.

Another very important factor in making dynamic unbalance determinations is the phase angle. The phase relationship between the forced vibrations and a disturbing force that produces them is usually represented by the phase angle "alpha," the latter being the amount of lag of the forced vibrations behind the disturbing force. The value of the phase angle, like that of the magnification factor, depends upon both the relative amount of damping and the ratio of the impressed frequency to the natural frequency. Thus, when the amount of damping approaches zero as a lower limit, the phase angle approaches zero as a limit for all values of the ratio of impressed frequency to natural frequency below one and approaches 180° out of phase for all values of such ratio greater than one. Thus, it can be seen that the phase angle is indeterminate at resonance with zero damping.

When damping is present, there will be a continual change in the phase angle as the ratio of impressed frequency to natural frequency increases or decreases. Also, regardless of the amount of damping, the phase angle will be 90° at resonance, i. e. at resonance the forced vibrations lag behind the disturbing force by one-quarter cycle for all values of damping.

When attempting to operate a balancing machine in which the impressed frequency and the natural frequency have a ratio of one, i. e. are at resonance, an extremely small departure in the impressed frequency, say a fraction of one cycle per second, from the resonant condition, will cause, particularly when the amount of damping is very small, the phase angle to change from zero to 180° or vice versa almost instantaneously. Thus, when an attempt is made to operate a balancing machine with the impressed and natural frequencies in resonance, it is imperative that the resonant condition be rigidly maintained when it is desired to obtain an accurate measurement of the phase angle. Otherwise, an extremely small straying from the resonant condition will cause extremely large fluctuations in the phase angle.

It has now been found that by causing the impressed frequency of the rotating mass to be substantially out of resonance with the natural frequency of the driven vibratory mass elastically connected thereto, minor fluctuations in the ratio of these two frequencies will have a substantially lessened effect in changing the value of the phase angle. Also, by tuning the frequencies so that the impressed frequency is higher than the natural frequency of the driven vibratory mass, the accuracy with which the vibratory mass reflects the impressed frequency is greatly increased and the effect of damping on the amplitude of vibration of the driven vibratory mass is reduced to a minimum, the amplitude being largely determined by the unbalance of the rotating mass. By tuning the frequencies to be such that the impressed frequency is lower, the phase angle decreases below 90° and the amplitude of vibration becomes much greater. However, the greater amplitude also causes an increase in damping with the result that accuracy is sacrificed for sensitivity.

Therefore, it is an object of this invention to provide an apparatus for determining a dynamic unbalance of a rotating mass wherein the effect of variations in damping on the measured results is decreased.

Another object is to provide a dynamic balancing apparatus wherein the vibrations of a rotating mass generate vibrations in a vibratory mass elastically connected thereto, the natural frequency of the vibratory mass being tuned a predetermined amount away from resonance with the rotating mass.

Still another object of this invention is to provide a dynamic balancing apparatus wherein damping can be reduced to a minimum without causing variations thereof to destroy the accuracy of the unbalance determination.

Yet another object of this invention is to provide a dynamic balancing apparatus wherein the effect of variations in damping on the amplitude of vibration of a driven vibratory mass is substantially reduced.

Even another object of this invention is to provide a dynamic balancing apparatus wherein a rotating mass is connected to a vibratable reed, the natural frequency of the reed being lesser or greater than the speed of rotation of the rotating mass by a predetermined and constant amount.

Still yet another object of this invention is to provide a dynamic balancing apparatus adapted to be employed to measure the amount and location of dynamic unbalance of a wheel such as an automobile wheel.

Even yet another object is to provide such a wheel balancing apparatus which is economical to construct and simple to operate.

A still further object is to provide a simple stroboscopic apparatus which is simple and cheap to manufacture, which is simple in use and which is particularly adapted to be used with the aforesaid wheel balancing apparatus.

Other objects, advantages and features of this invention will be apparent to one skilled in the art upon consideration of the written specification, the appended claims and the attached drawings wherein:

Fig. 1 is a side elevation of an embodiment of this invention adapted to practice the method thereof;

Fig. 2 is an enlarged view of portions of the apparatus of Fig. 1;

Fig. 3 is a view taken on the line 3—3 of Fig. 2 and illustrates the apparatus locked in a non-operative position;

Fig. 4 is similar to Fig. 3 except that it illustrates the apparatus in position for operation.

Like characters of reference are used throughout the several views to designate like parts.

Referring to Figs. 1-4, a rotatable mass 10 in the form of a shaft is shown in position on the apparatus and rotatably supported thereon by supporting means 11 and 12 so constructed and arranged that mass 10 is free to vibrate transversely of its axis of rotation. Mass 10 is rotated at a constant speed by a suitable driving means such as synchronous electric motor 13 connected thereto by an elastic coupling 14. Motor 13 and the anti-friction supporting means 11 and 12 are mounted on a suitable frame comprising a bottom plate 15 carrying upright end plates 16 and 17. The supporting means are slidably mounted on cross-rod supports 18 and 19 joined at their ends to plates 16 and 17. Motor 13 is supported from plate 16 by a suitable bracket 20.

The endwise slidable rotating mass supporting means 11 and 12 are identical in construction and comprise elastically mounted cradles 11a and 12a carried by vertically adjustable supports 11b and 12b. The vertically adjustable supports have a yoke 21 mounted on rod supports 18 and 19 so as to be movable therealong for adjusting their position with respect to motor 13. A set screw 22 is threaded to the yoke to prevent lateral movement of the supporting means once its position has been adjusted.

Extending from yoke 21 are a pair of vertical supporting rods 23 and 24 which have a shoulder 25 and a decreased diameter portion 26 received through corresponding holes in yoke 21 so that nuts 27 and 28 can be threaded thereto to rigidly fasten rods 23 and 24 to the yoke. Received across the upper ends of these rods is an upper yoke 29 having a bifurcated lower portion receiving rods 23 and 24 and clamped thereto by clamping bolt 30. Threaded through yoke 21 is an adjusting screw which is adapted to abut against upper yoke 29 and to raise the same after bolt 30 has been loosened. In this manner, very accurate vertical adjustment of upper yoke 29 can be readily secured.

Surmounting supports 11b and 12b and elastically connected thereto are cradles 11a and 12a adapted to rotatably support mass 10 with a minimum amount of friction resultant from its rotation. The cradles comprise a frame 35, having a groove cut in its upper edge to receive mass 10 therein and rollers 36 and 37 which are carried by the frame, via suitable anti-friction bearings on shafts 38 and 39. The latter have outturned flanges 40 at one of their ends fitted into a countersink in the frame and are maintained in such position by a leaf spring 41. With this construction, rollers 36 and 37 are removably mounted in frame 35 and their removal can be readily secured by merely releasing spring 41 and then pushing shafts 38 and 39 from the rollers and the frame.

It is to be noted that the outer circumference of rollers 36 and 37 is inverted V-shaped in cross-section to provide a semi-knifelike contact with mass 10. The purpose of this is to accurately locate the axial position of support of the mass by the rollers. With a roller having a wide face in contact with mass 10, the axial position of support of the mass upon the face of the roller is not determinable more accurately than to be some position within the width of the roller.

As stated, cradles 11a and 12a are resiliently mounted on supports 11b and 12b. This is accomplished by providing a flexure plate hinge composed of flexible plates 42 and 43 situated to cross at an angle when viewed from their edges, the apparent intersection being intermediate frame 35 and yoke 29. The ends of the plates are rigidly received in the frame and yoke respectively and can be clamped in slots therein by driving a pin into openings 44 and 45. The cradles are then free to rock laterally in a plane normal to the axis of rotation of mass 10, the flexure plates bending at their apparent intersection.

Means are provided for rigidly locking the cradles in a non-elastic condition with respect to their supports. This means can comprise a pair of vertically movable legs 46 and 47 slidably received in yoke 29 with their ends resting on eccentrics 48 and 49, respectively, formed on shaft 50. The latter has an arm 51 and handle 52 at its end to permit rotation thereof. Bolts 53 and 54 are threaded into legs 46 and 47 so that the length thereof is adjustable. With this construction, eccentrics 48 and 49 can be rotated to raise legs 46 and 47 to abut bolts 53 and 54 against frame 35 to prevent its lateral movement thereby locking it in a non-elastic position.

A driven vibratory mass 55 is elastically connected to rotating mass 10 in such a manner that it is free to vibrate in a plane normal to the axis of rotation of mass 10. The elastic connection can be by a long slender flexible member 56 which, with mass 55, can be considered to be a vibrating reed moving in a plane normal to mass 10. Member 56 has one of its ends rigidly secured to frame 35 by means of bracket 57 which has an upward extension 58 with scale 59 impressed thereon.

In accordance with this invention, the vibratable mass or reed is tuned to have a natural frequency differing from the speed of rotation of mass 10 by a predetermined amount, or, alternatively, the speed of rotation of mass 10 is made higher or lower than the natural frequency of the reed by such amount. Such difference should be enough to cause the frequency impressed by mass 10 on the vibrating reed to be in a non-resonant condition with respect to the natural frequency of the reed so that the phase angle is within the range of 100 to 180 degrees when maximum accuracy of measurement of unbalance is desired or within the range of 5 to 75 degrees when maximum sensitivity is desired. Determined more simply, the natural frequency of the reed is tuned to differ from the speed of rotation of mass 10 by at least 0.03 per cent of the latter, more preferably to be within the range of 97 to 99.97 and of 100.03 to 103 per cent of the speed of rotation of mass 10.

Thus, for example, in a balancing machine constructed as above described and with the reed tuned to a natural frequency of 1798 C. P. M. and the speed of rotation of mass 10 being 1800 R. P. M., the phase angle was found to be about 135 degrees and the amplitude of vibration of the reed about 14 on an arbitrary scale where the amplitude was about 33 with the reed tuned in resonance with the rotating mass.

In further example, with the reed tuned to a frequency of 1802 C. P. M. and mass 10 rotating at 1800 R. P. M., a phase angle of 45° and an amplitude of about 26, on the scale as above noted, were obtained.

Means are provided for determining the phase angle and comprise a stroboscopic light 60 periodically energized at selected intervals by a source of current connected through a timer 61 actuated by motor 13. Timer 61 is of the type well known to those skilled in the art and has a rotatable dial 62 which can be set to cause light 60 to flash whenever the shaft of motor 13 is at any selected rotative position. With this arrangement, an indexing mark can be made on mass 10 and the position of such mark determined for any particular position of the vibrating reed. Then, with knowledge of the phase angle, the position of unbalance can be determined.

Although it is believed that operation of the device is apparent from the foregoing, a short description thereof will be given to aid the disclosure.

With handle 52 rotated to the position of Fig. 3 so that cradles 11a and 12a are locked in a non-elastic position by legs 46 and 47, mass 10, which can be of varying diameter as indicated by the full and dashed outline of Fig. 3, can be placed on rollers 36 and 37 and can be attached at one end by connection 14 to motor 13. Then, one of cradles 11a or 12a can be unlocked, leaving the other in locked position. After motor 13 has come up to constant speed, the amplitude of vibration of the vibrating reed (mass 53 and member 56) can be determined from scale 59. By means of stroboscopic light 60, set to flash when the reed is in a predetermined position, such as at the mid-point of its path of movement, the angular location of an index mark on mass 10 can be determined. Then, by suitable calculations, well known to the art, the amount and location of unbalance can be determined.

Since dynamic unbalance is caused by a couple of forces, it will be necessary to make a determination of unbalance of mass 10 at another point removed from the point of the first determination. This can be done by locking the cradle at the point just having had a determination made and unlocking the other cradle and repeating the determination as above.

Thus, it will be seen that there is provided a method for determining the dynamic balance of a rotatable mass, the primary steps of the method being rotating a mass, such as 10, at a constant speed and transmitting the resulting driving vibrations to a vibratory mass to cause the latter to have a forced vibration in the plane of the axis of rotation of the mass, the natural frequency of the vibratable mass being tuned to be a predetermined and constant amount above or below the speed of rotation of the mass as above described.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A dynamic balancing apparatus which comprises in combination: (1) a horizontally extended frame, (2) a constant speed motor mounted at one end of said frame, having its drive shaft extending toward the opposite end of the frame with the shaft located above said frame, (3) a pair of supporting units for rotatably supporting a machine part whose dynamic unbalance characteristics are to be determined slideably mounted on said frame for adjustable positioning relative to the ends of said frame, each of said supporting units comprising: (A) means carried by the unit to affix the unit in a horizontally adjusted position upon said frame, (B) vertically extending standard means which includes upper and lower members moveable relative to one another in a vertical plane to effect adjustment in height of the support unit, (C) a cradle elastically mounted upon said upper member adapted to support a rotating machine part and permit vibration of the part and cradle in a plane normal to the axis of rotation of said motor shaft, and (D) locking means carried by said upper member which can be moved into a position engaging said cradle to effect a non-elastic mounting of the cradle, and (4) a vibratable reed connected to each of the cradles having a natural vibration frequency unequal to the speed of rotation of said constant speed motor.

2. A dynamic balancing apparatus which comprises in combination: (1) a horizontally extended frame, (2) a constant speed motor mounted at one end of said frame having its drive shaft extending toward the opposite end of the frame with the shaft located above said frame, (3) a pair of supporting units for rotatably supporting a machine part whose dynamic unbalance characteristics are to be determined slideably mounted on said frame for adjustable positioning relative to the ends of said frame, each of said supporting units comprising: (A) means carried by the unit to affix the unit in a horizontally adjusted position upon said frame, (B) a pair of vertically extending rods on said means, (C) a yoke having a hole at each end through which one of said rods extends, (D) means to clamp the yoke in a vertically adjusted position upon said rods to effect an adjustment in height of the support unit, (E) a cradle frame elastically mounted upon the yoke to permit vibration of the cradle frame in a plane normal to the axis of rotation of said motor shaft, (F) a pair of idler rollers journalled upon said cradle frame to support a rotating machine part and (G) cam-operated vertically moveable leg elements slideably carried in said yoke which may be moved into a position engaging the base of said cradle frame to effect a non-elastic mounting thereof, and (4) a vibratable reed connected to each of the cradle frames having a natural vibration frequency within the range of 97 to 99.97 and 100.3 to 103 percent of the speed of rotation of said constant speed motor.

References Cited in the file of this patent

UNITED STATES PATENTS

| | | |
|---|---|---|
| 1,481,785 | Akimoff | Jan. 29, 1924 |
| 1,591,855 | Marsland | July 6, 1926 |
| 1,641,447 | McGall | Sept. 6, 1927 |
| 1,951,828 | Heymann et al. | Mar. 20, 1934 |
| 2,090,803 | Moore | Aug. 24, 1937 |
| 2,301,291 | Kolesnik | Nov. 10, 1942 |
| 2,341,444 | Hunter | Feb. 8, 1944 |
| 2,383,405 | Merrill et al. | Aug. 21, 1945 |
| 2,405,474 | Van Degrift | Aug. 6, 1946 |
| 2,426,305 | Hope | Aug. 26, 1947 |
| 2,486,896 | Weaver et al. | Nov. 1, 1949 |
| 2,522,260 | Forster | Sept. 12, 1950 |

FOREIGN PATENTS

| | | |
|---|---|---|
| 508,120 | France | July 16, 1920 |
| 700,613 | Germany | Dec. 24, 1940 |